(12) United States Patent
Gabeiras et al.

(10) Patent No.: US 9,669,497 B2
(45) Date of Patent: Jun. 6, 2017

(54) METHOD FOR ASSEMBLING A BLADE OF A WIND TURBINE

(71) Applicant: ACCIONA WINDPOWER, S.A., Navarra (ES)

(72) Inventors: Teresa Arlaban Gabeiras, Navarra (ES); José Miguel García Sayés, Navarra (ES); Ander Gastón Lujambio, Navarra (ES); Miguel Núñez Polo, Navarra (ES); Alvaro Gorostidi Martinez de Lecea, Navarra (ES)

(73) Assignee: ACCIONA WINDPOWER, S.A., Navarra (ES)

( * ) Notice: Subject to any disclaimer, the term of this patent is extended or adjusted under 35 U.S.C. 154(b) by 0 days.

(21) Appl. No.: 15/241,614

(22) Filed: Aug. 19, 2016

(65) Prior Publication Data
US 2016/0354879 A1 Dec. 8, 2016

Related U.S. Application Data

(62) Division of application No. 13/909,886, filed on Jun. 4, 2013, now Pat. No. 9,446,446.
(Continued)

(51) Int. Cl.
*F03D 1/06* (2006.01)
*B23P 15/04* (2006.01)
(Continued)

(52) U.S. Cl.
CPC .............. *B23P 15/04* (2013.01); *B21K 3/04* (2013.01); *F03D 1/0658* (2013.01); *F03D 13/10* (2016.05);
(Continued)

(58) Field of Classification Search
CPC ......... B21K 3/04; F03D 1/001; F03D 1/0658; Y02P 70/523; Y10T 29/49336;
(Continued)

(56) References Cited

U.S. PATENT DOCUMENTS

| 8,083,212 B2 | 12/2011 | Numajiri et al. |
| 2006/0228220 A1 | 10/2006 | Wobben |
| 2009/0058096 A1 | 3/2009 | Wobben |

FOREIGN PATENT DOCUMENTS

| WO | WO-2010034288 | 4/2010 |
| WO | WO-2011064659 | 6/2011 |

*Primary Examiner* — Sarang Afzali
*Assistant Examiner* — Ruth G Hidalgo-Hernandez
(74) *Attorney, Agent, or Firm* — Blakely Sokoloff Taylor & Zafman LLP

(57) ABSTRACT

The wind turbine has a tower; a nacelle; and a hub comprising a hub connection flange for being detachably connected to a blade connection flange of a rotor blade. The method comprises the next steps: fixing a first positioning element in the nacelle or in the top of the tower; fixing a second positioning element to the blade in a root blade area; lifting the blade to the vicinity of the hub connection flange by means of lifting means; putting into contact the first and the second positioning elements; providing an accurate position of the blade connection flange, prior to the connection to the hub connection flange, by cooperation of the first and second positioning elements; and providing, when the first and the second positioning elements cooperate, a trajectory of the blade which is parallel to the axis of a hub connection hole, disposed in the hub connection flange, the provision of the trajectory being carried out by means of a guided element joined to either the first positioning element, the second positioning element, or both.

12 Claims, 13 Drawing Sheets

Related U.S. Application Data

(60) Provisional application No. 61/655,311, filed on Jun. 4, 2012.

(51) Int. Cl.
*B21K 3/04* (2006.01)
*F03D 13/10* (2016.01)

(52) U.S. Cl.
CPC ..... *F05B 2230/61* (2013.01); *F05B 2240/916* (2013.01); *Y02E 10/721* (2013.01); *Y02E 10/726* (2013.01); *Y02E 10/728* (2013.01); *Y02P 70/523* (2015.11); *Y10T 29/49336* (2015.01); *Y10T 29/53* (2015.01)

(58) Field of Classification Search
CPC ................. Y10T 29/53; F05B 2230/61; F05B 2240/916; Y02E 10/721; Y02E 10/72
See application file for complete search history.

A-A'

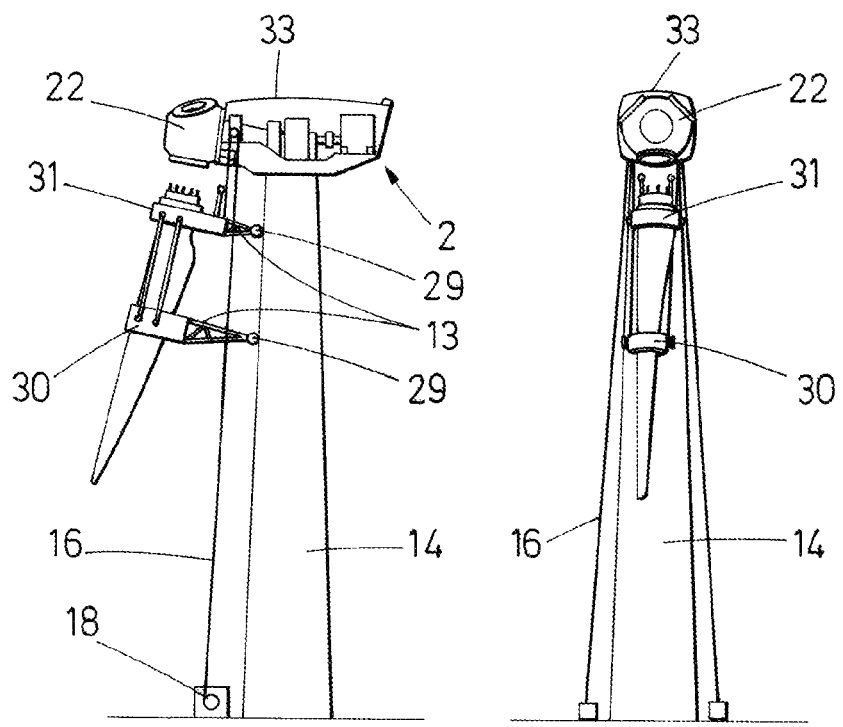
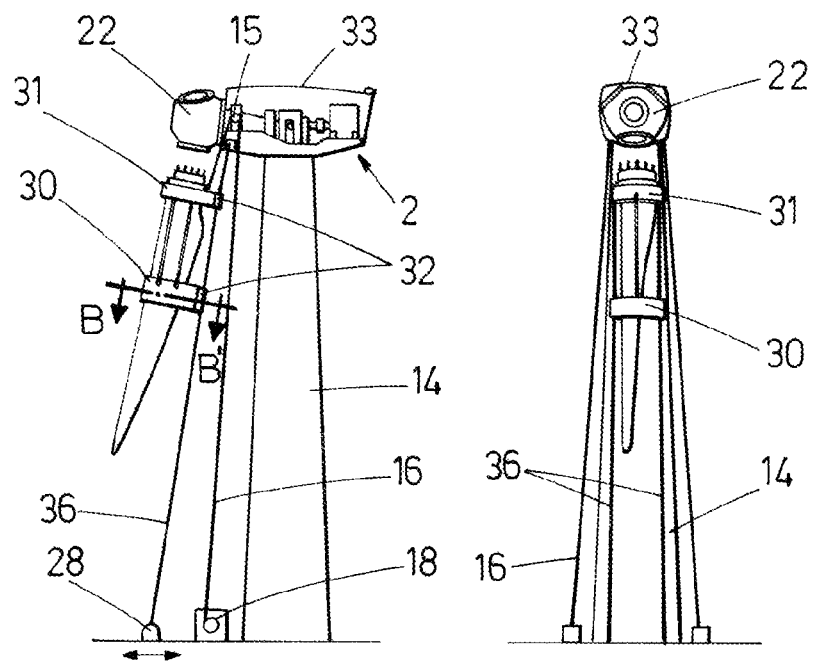

B-B'

METHOD FOR ASSEMBLING A BLADE OF A WIND TURBINE

CROSS REFERENCE TO RELATED APPLICATION

This application is a divisional application of application Ser. No. 13/909,886, filed Jun. 4, 2013, now U.S. Pat. No. 9,446,446, which application claims priority from U.S. Provisional Patent Application No. 61/655,311, filed on Jun. 4, 2012, both of which are incorporated herein by reference.

BACKGROUND

Currently, there is a trend in the wind energy sector toward higher power rating of wind turbines in order to reduce the cost of energy. This causes a subsequent increase in weight and dimensions of most of the components comprised in the wind turbine, including the rotor. Another trend for increasing energy capture has been to design taller towers to take advantage of greater wind energy at higher levels above ground, most of the designs nowadays being 100 m high and taller.

Particularly relevant for the assembly and maintenance costs are tower height, rotor diameter and weight of hub and blades, due to their direct impact on crane capacity and cost of the same, being the most important the first of them. Tower height determines the system and process required for assembling components relatively heavy and/or bulky, such as the hub or the blades: an increase in height implies bigger bending moments that have to be stood by the cranes, and that make necessary the use of higher capacity cranes than the actual weight being lifted and whose use can be really expensive.

In the specific case of operations for assembling blades, there are three procedures most commonly used:

Preassembling the hub and the blades at ground level and lifting the preassembled system to the top of the nacelle;

Lifting and assembling each blade one by one in a horizontal position and connecting them to the hub on top of the tower. In order to lift the blade in such a position and avoid it from turning and collapsing, this process requires either two cranes connected to the blade in both sides of it, or a single crane making use of a special tool to compensate possible variations of the center of gravity of the blade in relation to the position of the lifting point; and Lifting and assembling each blade one by one in a vertical position and connecting them to the hub on top of the tower. It usually comprises a hoisting system and a plurality of pulleys installed within the hub and nacelle, in order to avoid the use of a big crane.

Among the last of the listed procedures there are several alternatives in the state of the art:

US Patent Application Publication US 2009/0058096 (Wobben) discloses a method of mounting or dismantling a rotor blade of a wind power installation without using a crane. A cable is stretched between a part in the outside surface of the hub of the wind power installation and the bottom region of the wind power installation. The rotor blade is moved along the cable upwardly upon mounting or downwardly upon dismounting the blade.

U.S. Pat. No. 8,083,212B2 discloses a method of mounting a rotor blade, which allows the blade to be mounted and removed without using multiple construction machines. The suspension device has a pulley inside the hub, a holding section inside or outside a blade, and a winch. The pulley leads a suspension wire from the rotor hub, on which the blade is to be mounted, to the holding section fixed at the root end and inside the blade. The holding section holds the mounting end side of the blade such that a line connecting the center of gravity of the blade and a connection section to which the suspension wire is connected intersects with the longitudinal axis of the blade. The winch is placed on the ground and raises and lowers the holding section/blade by pulling in and paying out the suspension rope.

WO2011064659A2 discloses a system for assembling a rotor blade comprising a modular truss system including at least one pulley and two mounting beams, each mounting beam being detachably connected to a hub connection flange, thereby positioning the pulley beam above a further hub connection flange and a blade pulley system including at least one pulley and being detachably connected to the blade connector portion of a rotor blade. To avoid any damage to the hub connection flange or the pitch bearing, they are aligned before they come in contact with each other by mean of a plurality of flexible cables, each of them connected to the outer race of the pitch bearing of the blade being assembled, passing through holes in the respective flange of the hub and further connected to a hoist arranged in the hub or the nacelle.

The above-described publications have the disadvantage of comprising elements of the lifting system (i.e. pulleys, winches, cables, etc.) inside the hub and, therefore, their position for mounting one blade is not proper for the assembly of another one: these elements have to be adequately mounted once per blade assembled; that is thrice for a conventional rotor. This operation is time consuming and increments the cost of the whole method. Moreover, those elements have to be disassembled and lowered to the ground once the operation has finished, and so, they have to be moved to an access door provided in the rear of the nacelle or in the front of the hub.

Moreover and even more important, they do not provide an efficient and robust system for positioning and guiding the blade into engagement with the hub connection flange, this operation being crucial for preventing damage from being infringed to any element.

SUMMARY

It is desirable to provide an apparatus and method, which facilitates the repair and replacement of wind turbine blades, minimizing the number of steps and the time required, not only for the assemble/disassembly of a single blade, but also of a whole rotor and, therefore, reduces the costs of such repair and replacement.

In order to provide a solution to the above mentioned drawbacks of state-of-the-art systems and methods, a system and a method for assembling and disassembling components from a wind power turbine are disclosed herein.

The wind turbine comprises a tower resting on a base, a rotor comprising at least one rotor blade having a blade connection flange and a nacelle mounted atop the tower. The rotor further comprises a hub rotatably connected to a nacelle and comprising a plurality of hub connection flanges adapted to be detachably connected to a blade connection flange of a rotor blade.

The system for assembling and disassembling components from a wind power turbine further comprises: at least one first positioning element adapted to be attached to a nacelle or to a tower in a top area and configured to provide an accurate position of the blade connection flange prior to connection to a hub flange, i.e. of the bolts of the blade with respective holes in the hub flange. For this purpose, it is configured to cooperate with a corresponding second positioning element adapted to be joined to the blade in a root blade area. In this way, an adequate position of the blade connection flange with respect to the hub connection flange can be ensured even by lifting the blade from a point fixed to a non-rotating component located at the top of a tower, by non-rotating meaning that it does not turn as the rotor turns, as for example, to a nacelle or tower. Therefore, it provides the advantage over the state-of-the-art methods of raising the blade form a non-rotating point while ensuring an accurate position of the blade with respect to the hub, thus avoiding the inclusion of system elements like pulleys and cables inside the hub, which have to be changed once per blade being mounted.

In an embodiment, the system of the invention further comprises one guiding element configured to provide an adequate trajectory of the second positioning element in the final movement of the blade towards the hub and when the first and second positioning elements cooperate. By adequate trajectory, an upward trajectory of the blade substantially parallel to the axis of a hub hole is meant. The guiding element is joined to either the first positioning element, or the second positioning element, or both. In an embodiment, it is configured to cooperate with a corresponding second guiding element attached to the blade.

The guiding element provides a further advantage of the proposed system over the state-of-the-art that is adjusting the trajectory of the blade in its final movement so as to ensure that, if the angle of the blade is adequate, i.e. if the bolts of a blade are parallel to the holes in which they are to be inserted, and given that the position is precise, the insertion of the bolts will be performed with no interference of the bolts with the hub flange or any other components. The angle of the blade can be modified by a retaining cable connected to the blade and to a retaining crane, for example.

Supporting means adapted to be joined to the blade in a supporting blade area located between a maximum chord area and the blade tip for a better adjustment of the angle of the blade in its final movement toward the hub and prior to inserting the blade stud or bolts into respective hub holes. The supporting means are adapted to rest on the tower or on at least one tensioned cable connected between the ground area and the nacelle or tower. They provide an adequate alignment between the hub connection flange and the blade connection flange, by separating the supporting blade area from the tower at a distance that, when the first and second positioning elements cooperate, the axis of a blade stud is substantially parallel to the axis of a hub connection hole.

With the proposed system, a reduced number of operations are required for assembling a complete rotor with respect to previous methods, by having the elements required for the operation fixed to a non-rotating component of the wind turbine, and a precise movement and positioning is ensured.

From now on, details of specific embodiments of the invention are disclosed with reference to the figures.

BRIEF DESCRIPTION OF THE DRAWINGS

FIG. 12 shows a side view of a wind turbine comprising a system as described in the specification plus a blade raising tool comprising wheels resting on the tower surface.

FIG. 13 shows a front view of a wind turbine comprising a system as described in the specification plus a blade raising tool comprising wheels resting on the tower surface.

FIG. 14 shows a side view of a wind turbine comprising a system as described in the specification in which the first guiding element comprises a couple of tensioned cables attached on a first end to the region of the nacelle, and on the second end, to an attaching point provided at the ground level.

FIG. 15 shows a front view of a wind turbine comprising a system as described in the specification in which the first guiding element comprises a couple of tensioned cables attached on a first end to the region of the nacelle, and on the second end, to an attaching point provided at the ground level.

DETAILED DESCRIPTION

Figure 1:
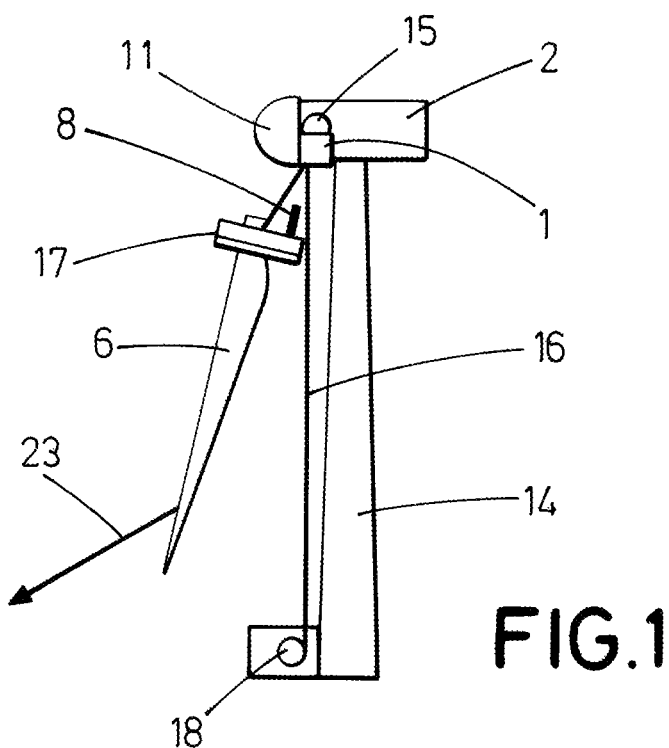
FIG. 1 is a side general view of a system for assembling a blade to a hub.
Figure 2:
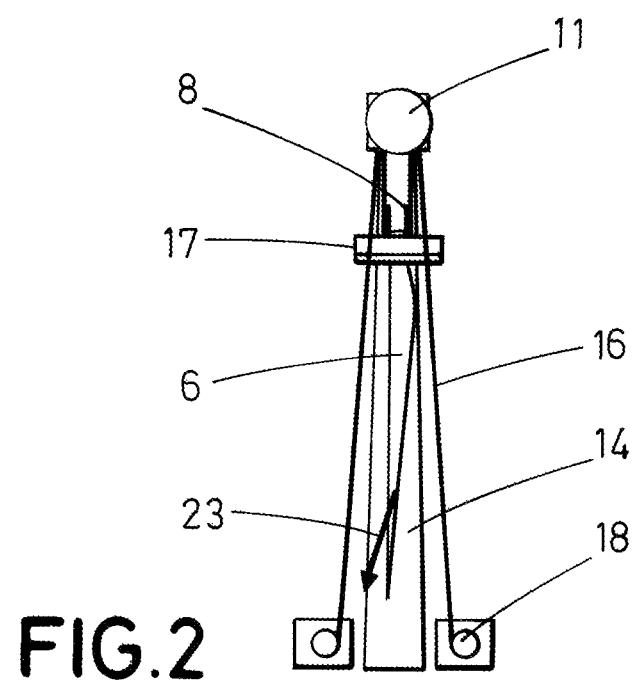
FIG. 2 is a front general view of a system for assembling a blade to a hub.
Figures 9, 10:
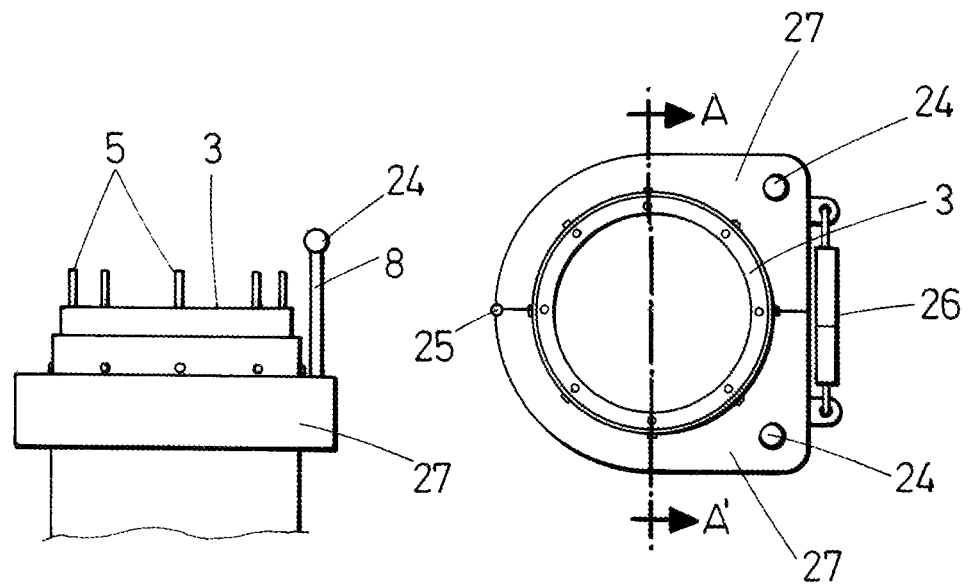
FIG. 9 is a side view of a blade raising tool used in a preferred embodiment.
FIG. 10 is a top view of a blade raising tool used in a preferred embodiment.
Figure 11:
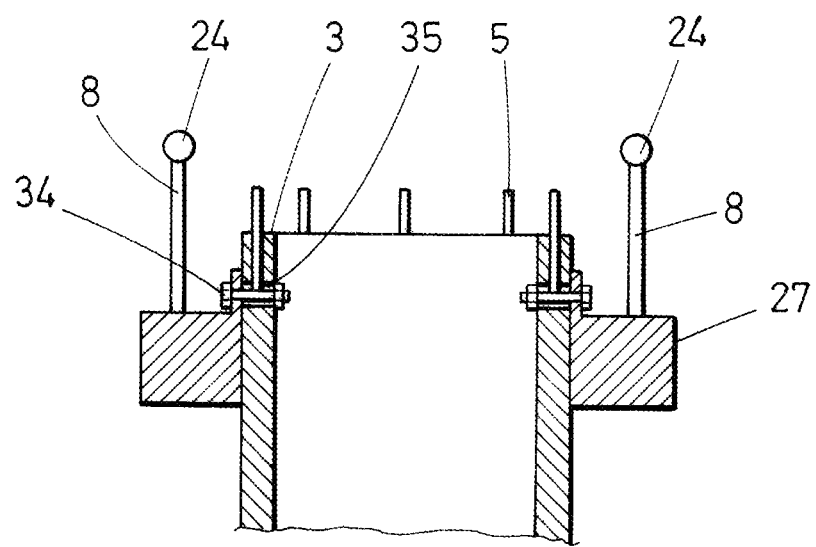
FIG. 11 is a section A-A' of FIG. 10.
Figure 16:
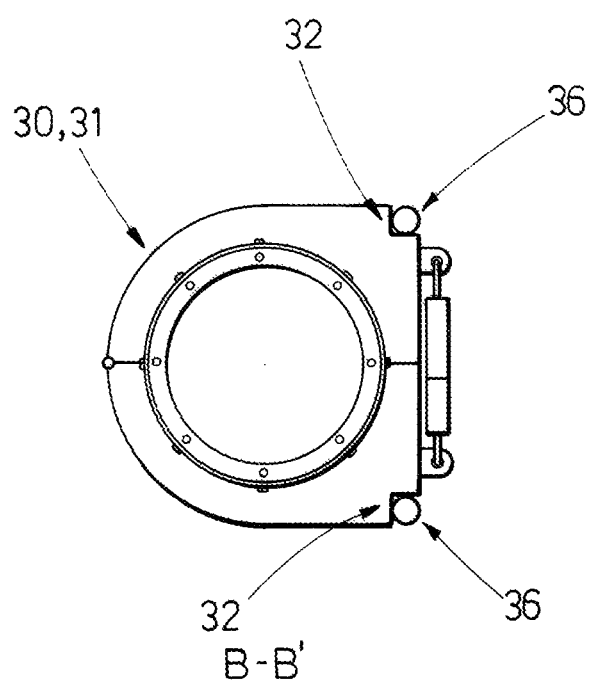
FIG. 16 is a section B-B' of FIG. 14.
Figure 17:
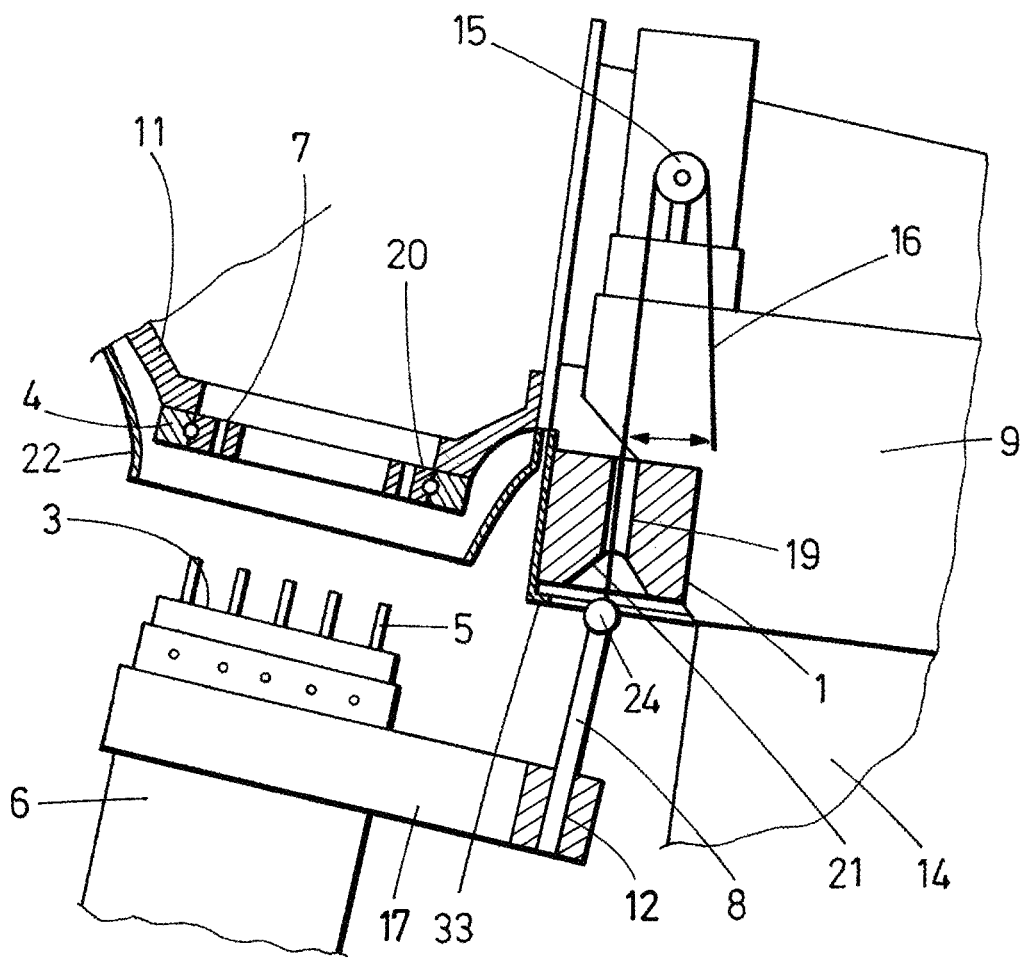
FIG. 17 shows a detail of the system for assembling a blade wherein a guiding element is joined to the second positioning element and when the blade is approaching the first positioning element.
Figure 18:
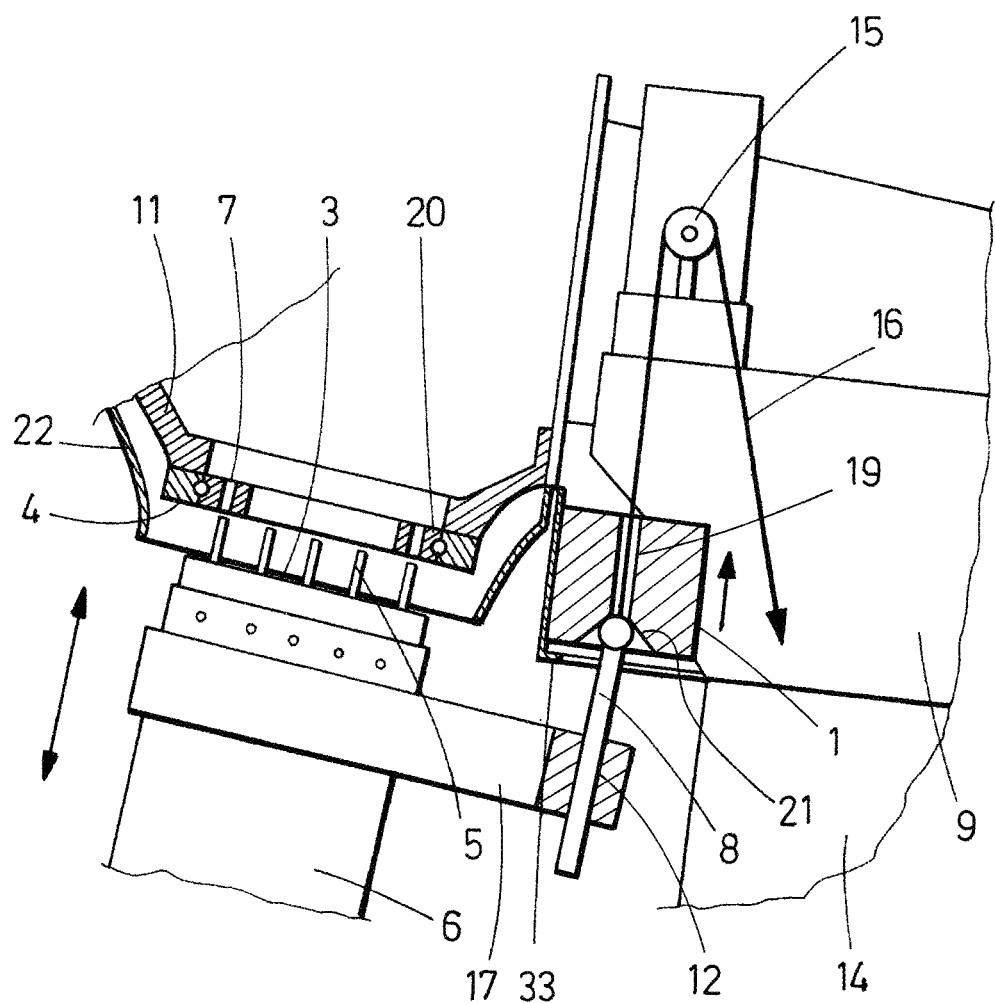
FIG. 18 shows a detail of the system of FIG. 17 wherein the guiding element is joined to the second positioning element and when the second positioning element comes into contact with the first positioning element.
Figure 19:
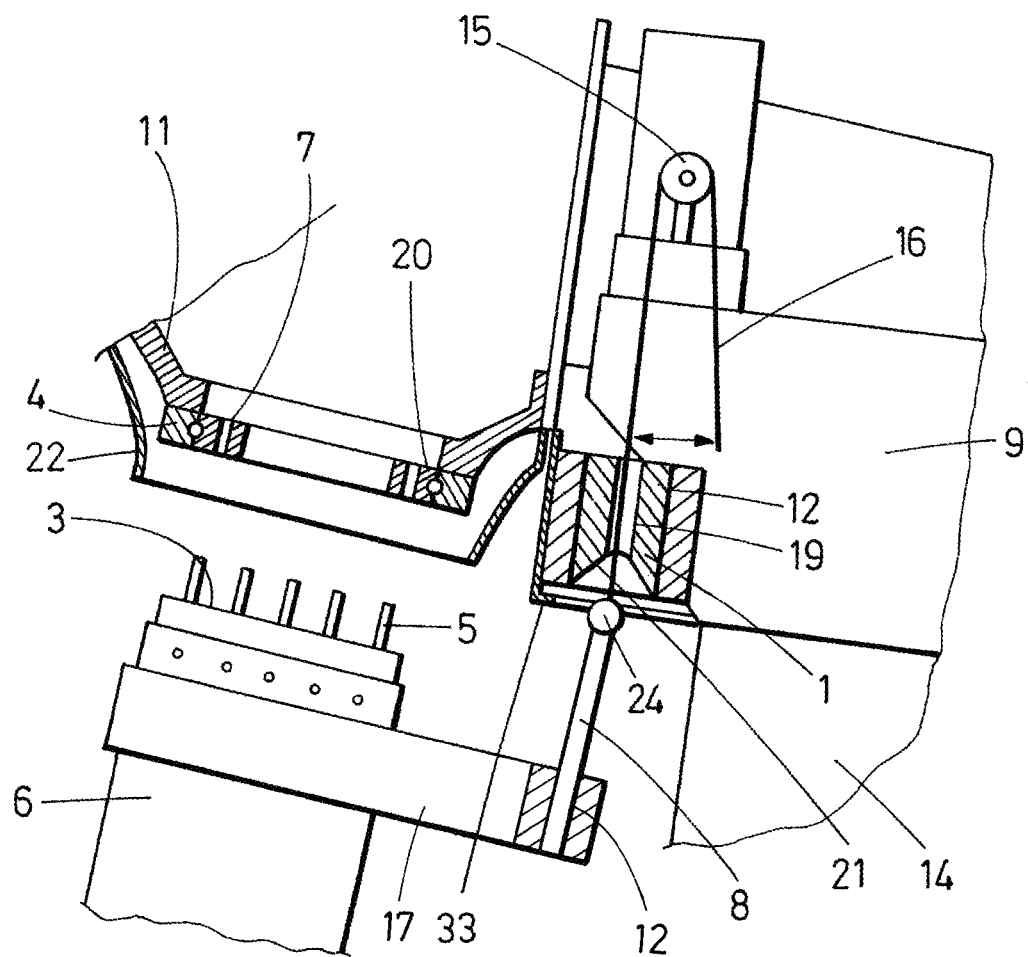
FIG. 19 shows a detail of the system for assembling a blade wherein a guiding element is joined to both the first and the second positioning elements and when the blade is approaching the first positioning element.
Figure 20:
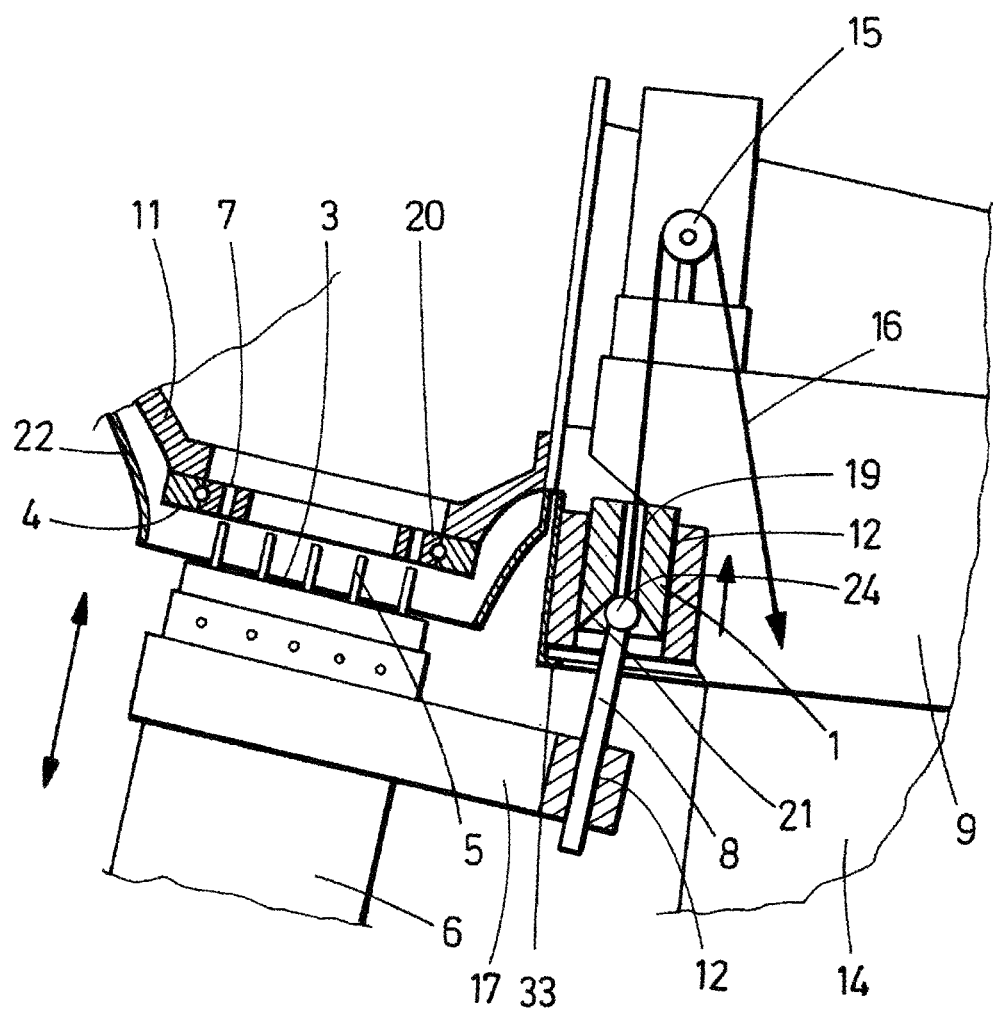
FIG. 20 shows a detail of the system of FIG. 19 wherein the guiding element is joined to the first and the second positioning elements and when the second positioning element comes into contact with the first positioning element.

Referring to the drawings the system for assembling and disassembling components from a wind power turbine comprises:

One first positioning element (1) adapted to be attached to a nacelle (2) or to a tower in a top area and configured to provide an accurate position of the blade connection flange (3) prior to connection to a hub flange (4), i.e. of the bolts (5) of the blade (6) with respective holes (7) in the hub flange (4). For this purpose, it is configured to cooperate with a corresponding second positioning element (8) fixed to the blade (6) as shown in FIGS. 9-11. Preferably, the system comprises two first positioning elements (1) located in the nacelle (2), attached in the front part of the main frame (9), one in each side of the main shaft (10) shown in FIGS. 3 and 4 and configured to cooperate with two second positioning elements (8) fixed to the blade (6), so as to provide an accurate position of the blade flange (3) with respect to the hub (11). Optionally, the first positioning elements (1) are fixed to the main frame (9) in such a way that their position in relation to the main frame (9) can be controllably modified when the second positioning element (8) is correctly placed in relation to it, for example, by moving them in any of the three coordinate directions by means of linear actuators, driving means, screws or the like;

One guiding element (12) located in the region of the nacelle (2) and configured to provide an adequate trajectory of the second positioning element (8) in the final movement of the blade (6) towards the hub (11). By adequate trajectory, an upward trajectory of the blade substantially parallel to the axis of a hub hole is meant. For this purpose, in some embodiments it is configured to cooperate with a corresponding second guiding element (8) attached to the blade (6).

For a better adjustment of the angle of the blade (6) in its final movement toward the hub (11) and prior to inserting the blade stud or bolts (5) into respective hub holes (7), the system also comprises some supporting means (13) adapted to be joined to the blade (6) in at least one supporting blade area located between a maximum chord area and the blade tip. Another supporting means are provided in a blade raising tool (as can be seen in FIG. 12). The supporting means (13) are adapted to rest on the tower (14) or on at least one tensioned cable (36) connected between the ground area and the nacelle (2) or tower (14). They provide an adequate alignment between the hub connection flange (4) and the blade connection flange (3), by separating the supporting blade area from the tower (14) at a distance that, when the first (1) and second (8) positioning elements cooperate, the axis of a blade stud or bolts (5) is substantially parallel to the axis of a hub connection hole (7).

The system for assembling and disassembling components from a wind power turbine further comprises some lifting means including the following elements:

A pulley system including at least one pulley (15) detachably connected to the main frame (9) of the wind turbine. It (15) can also be connected to any other component stationary connected with the main frame (9) or tower (14). Said connection may be done via beams or any other structural component in order to achieve an optimal location of the pulleys (15) with respect to the hub (11).

Figure 3:
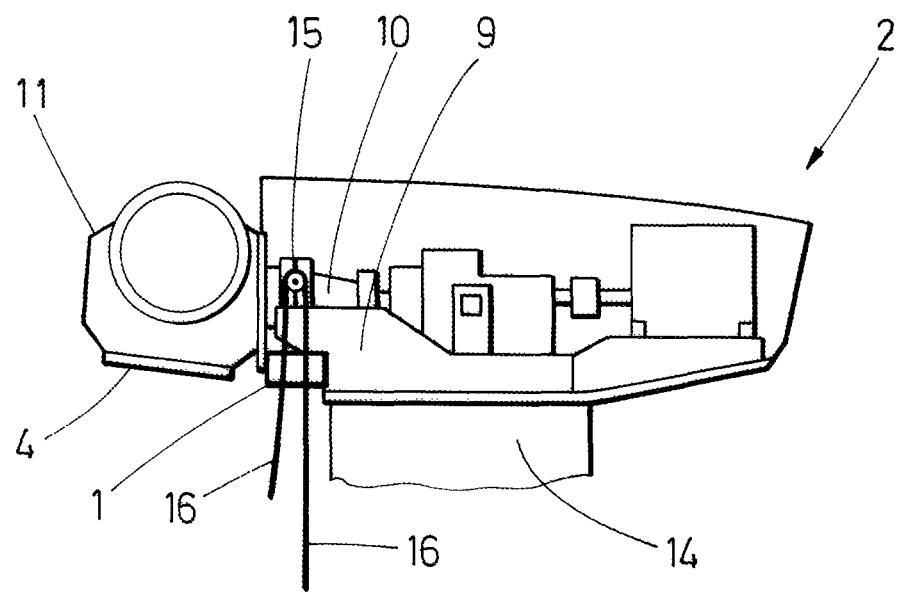
FIG. 3 shows a side view of a nacelle comprising two first positioning and guiding elements and two pulleys.
Figure 4:
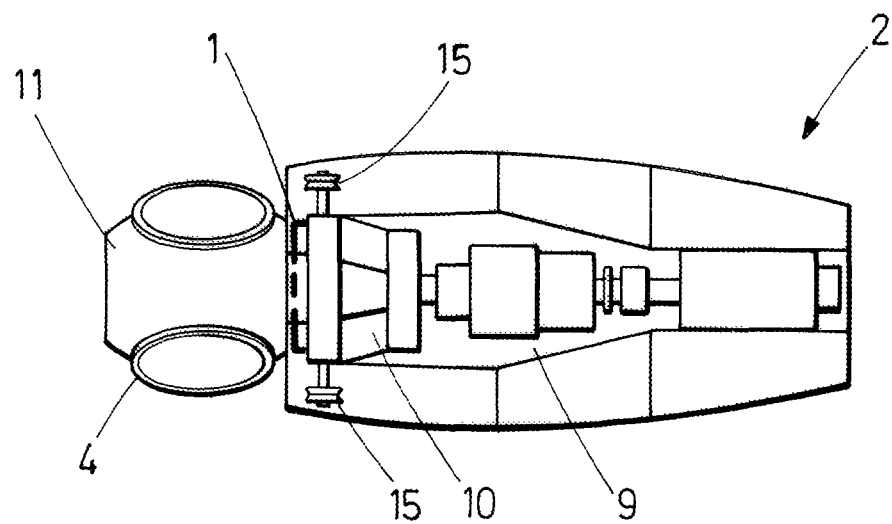
FIG. 4 shows a top view of a nacelle comprising two first positioning and guiding elements and two pulleys.

Preferably, the pulley system comprises two pulleys (15) in the front part of the main frame (9), one in each side of the nacelle (2) as shown in FIGS. 3 and 4. The pulley system guides at least one cable (16) from a blade raising tool (17) wherein the second positioning element is disposed, to a hoisting system (18) as shown in FIG. 1.

At least one cable (16) connected to a blade raising tool (17) in one side and to a hoisting device (18) in the other side through one pulley (15) provided in the nacelle (2). In a preferred embodiment there are two cables (16) connected to the blade raising tool (17) and to two hoisting devices (18) located on the ground in the proximity of the tower (14) base, through two pulleys (15) located inside the nacelle (2).

To lower or raise a rotor blade (6), the system comprises some kind of a hoisting device (18). Such hoisting device (18) may be arranged on the ground, for example on a truck, or may be an integral part of the wind turbine, arranged e.g. in the nacelle (2) or the tower (14). In the shown embodiment, the hoisting device (18), in form of a winch, is located on the ground outside the turbine. The winch is a mechanical device that is used to wind up or wind out the cable (16) to pull the cable (16) in to raise the blade (6) or let the cable (16) out to lower the blade (6). In a preferred embodiment there are two winches connected to two cables (16) located on the ground in the proximity of the tower (14) base.

This embodiment provides a degree of redundancy to avoid fatal damage of the blade (6) in case there is a failure of the system, for example, of one of the two winches.

The elements of the system are attached to the blade (6) and main frame (9) only if a blade (6) should be mounted or lowered, and therefore no additional weight is added to the turbine in its operating condition.

Preferably, the blade raising tool (17) is attached to the blade (6) on the outer surface. One possibility for said attachment is to fixate the tool (17) via bolts (34) to t-bolts (35) embedded in the blade (6) in the area of the root. They have to be accessible for extraction once the blade (6) is connected to the hub (11) in order to descend the tool (17) and proceed to the connection of another blade (6). For this purpose, in a preferred embodiment some thru holes are provided in the t-bolts as shown in FIGS. 9-11.

FIGS. 5-8 show four different stages in the process of assembling a blade (6).

Figure 5:
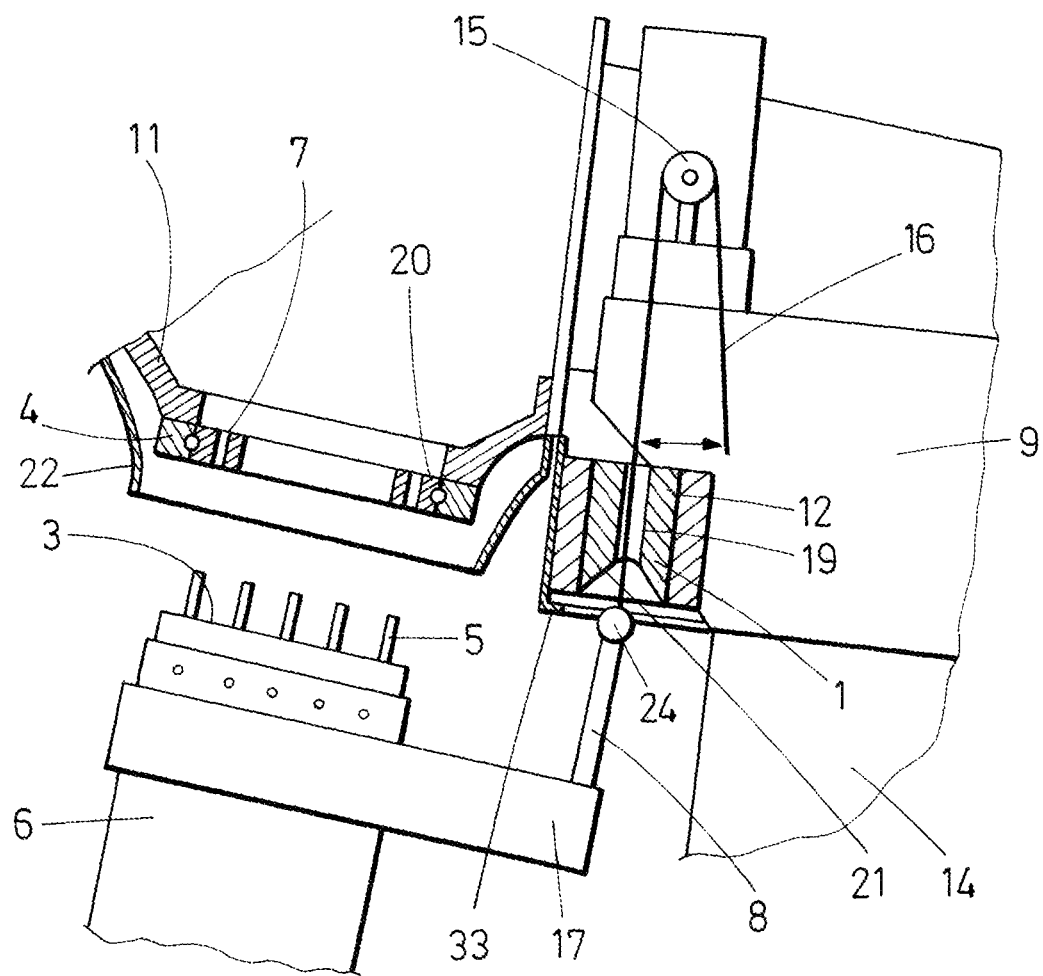
FIG. 5 shows a detail of the system for assembling a blade (stage 1 of a sequence of 4 stages: second positioning and guiding element approaching the first positioning and guiding element).
Figure 6:
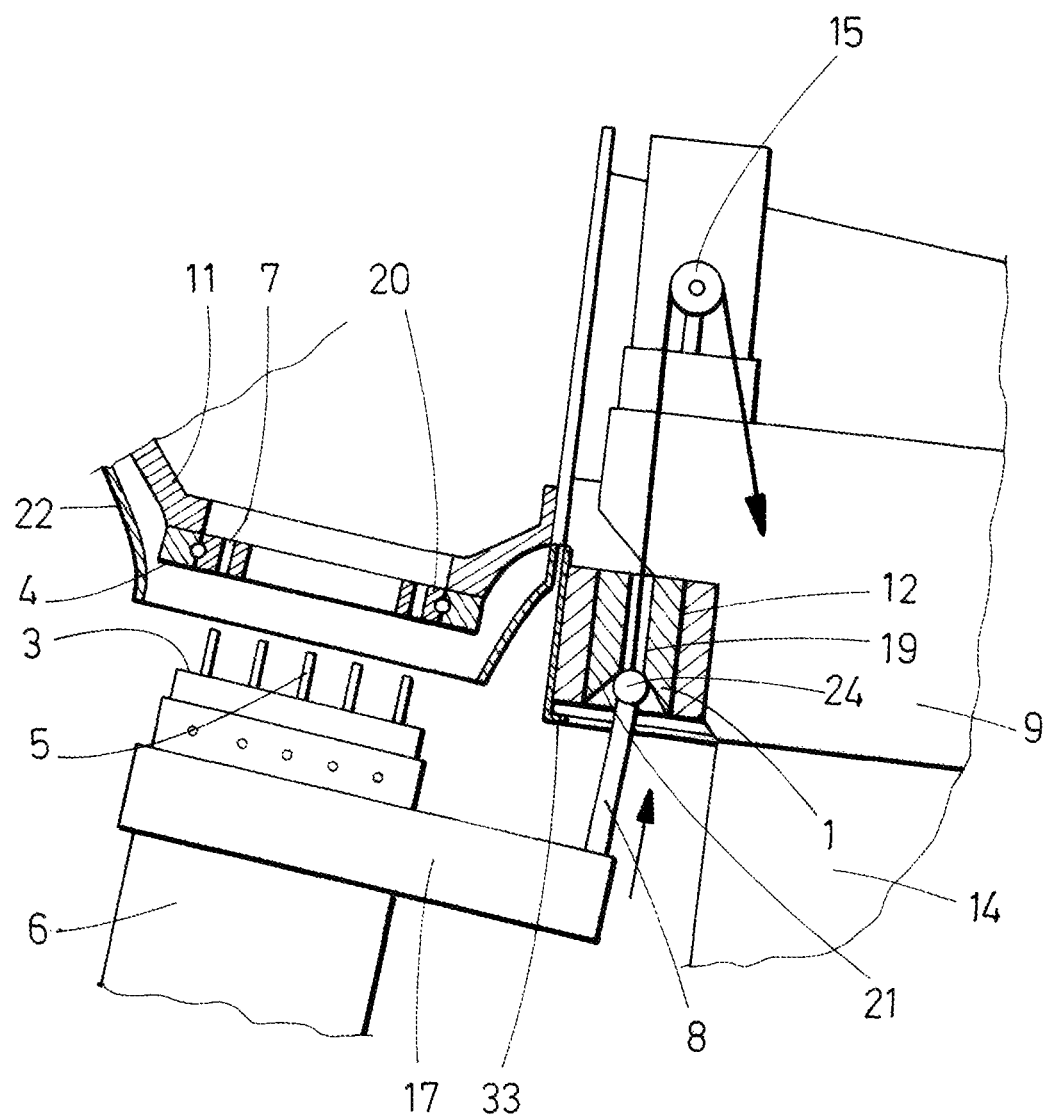
FIG. 6 shows a detail of the system for assembling a blade (stage 2 of a sequence of 4 stages.

In FIG. 5 a detail of the system for assembling a blade (6) is shown. Attached to a main frame (9) of the wind turbine, one of the pulleys (15) and one of the first positioning (1) elements and one of the first guiding (12) elements are shown (the others being in the other side of the shaft (10)). A cable (16) is passed through the pulley (15) and connected to the blade raising tool (17) in one of its ends and to a winch (not shown) in the other one. In this specific embodiment, the cable (16) also passes through a first thru hole (19) provided in the first positioning element (1).

The blade raising tool (17) is attached to the blade (6) via bolts (34) connected to the T-bolts (35) in the area of the root. It comprises a pair of second positioning elements (8), as shown in FIGS. 9-11. A pair of cables (16) is connected to the blade raising tool (17), in this specific embodiment being connected directly to the second positioning elements (8), more precisely, to the upper end of them. This is a non-required feature, but it can be advantageous, for example, for attaching the blade raising tool (17) to the blade (6) when the blade is already assembled.

The blade connection flange (3) of the blade (6) is provided with bolts (5) protruding through it and configured to be connected to a blade pitch bearing (20) attached to the hub (11), by inserting said bolts (5) into respective holes (7).

The first positioning element (1) is provided with a second hole (21) larger than the upper end of the second positioning element (8) (being for example hemispheric or conical-shaped) and configured to allocate said second positioning element (8) in a specific position. The first positioning element (1) is also connected to a first guiding element (12) in a movable manner, in such a way that it can be moved upwards and downwards and parallel to the holes (7) provided in the blade pitch bearing (20).

Also important is the fact that the first (1) and the second (8) positioning elements are attached to the main frame (9) and to the blade (6) respectively, in such a position that they come into contact before the upper end of the bolts (5) of the blade (6) reach the level of a hub cover (22). This provides the possibility of adjusting the position of any of those elements prior to interference and potential damage of the bolts (5) or the hub cover (22) or any other element herein.

In the second stage, the second positioning element (8) is adequately centered with respect to the first positioning element (1), the shape of each of them enabling this as the blade (6) is moved upwards by means of the cable (16) and the winch. In the case shown in the FIG. 6, the second positioning element (8) comprises a spherical end (24) that slides in contact with the second hole (21) of the first positioning element (1).

Preferably at this point but mandatory at stage three, the bolts (5) of the blade have to be parallel to the holes provided in the hub for their insertion. This cannot be done by leaving the blade in a vertical position: generally, the bolts are protruding from the blade connection flange in 90°, the blade connection flange being perpendicular to the axis of a blade, and the angle formed by the blade axis and an imaginary vertical plane has to be kept equal to the sum of the tilt angle, plus the conning angle and the preconning angle, i.e. the angle that is ideally formed between a blade axis and the vertical plane when the blade is finally assembled (being the tilt angle the angle formed by the shaft axis and a horizontal plane; the conning angle, the one comprised between a blade axis of rotation and a plane perpendicular to the shaft axis; and the preconning angle, the angle formed between the blade axis of rotation and a blade axis.

To do this, a retaining cable (23) attached to a retaining crane (not shown) can be used as shown in FIG. 1. In another embodiment shown in FIGS. 12 and 13, the desired angle of the blade (6) is set by adequate dimensions of at least a couple of supporting elements (13) attached to the blade raising tool (17) and resting on the tower (14) surface. Those supporting elements (13) may comprise some sort of wheels (29) in their end contacting the tower (14) surface, so as to roll on it as the blade (6) is raised. In still another embodiment, the desired angle of the blade (6) is set by adapting the position of an attaching point on the ground of a couple of guiding cables (36) acting as a first positioning elements, as shown in FIGS. 14 and 15.

Figure 7:
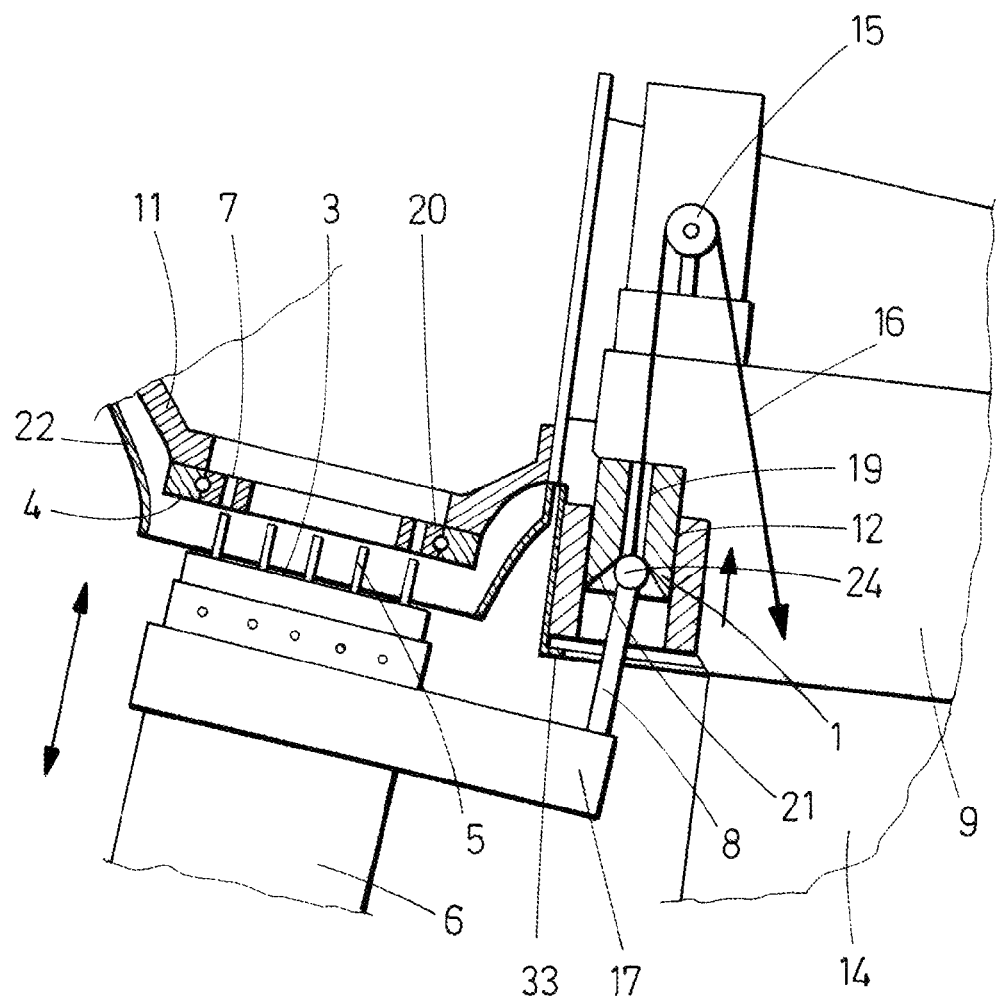
FIG. 7 shows a detail of the system for assembling a blade (stage 3 of a sequence of 4 stages).

In stage 3 shown in FIG. 7, the first positioning element (1) is moved upwardly guided by the first guiding element (12) as the blade (6) is raised, and, therefore, the trajectory of the second positioning element (8) remains parallel to the holes (7) of the pitch bearing (20). The first guiding element (1) can either be moved upwards directly being pushed by the second positioning element (8), or by actuating on it through, for example, some bolts.

At this moment (prior to inserting the bolts (5) of the blade (6) into respective holes (7) located in the pitch bearing (20)), if said blade connection bolts (6) are not properly positioned in relation to the holes (7), an accurate correction can be done by adjusting the position of the first positioning (1) and guiding (12) elements attached to the main frame (9). Obviously, coordination is required when adjusting the position in the case of having one positioning element (1) in each side of the shaft (10) (the same occurring with the cables (16) and the actuation of the winches when raising the blades (6)). Optionally, cables (16) can be attached to a same shaft of a winch.

Figure 8:
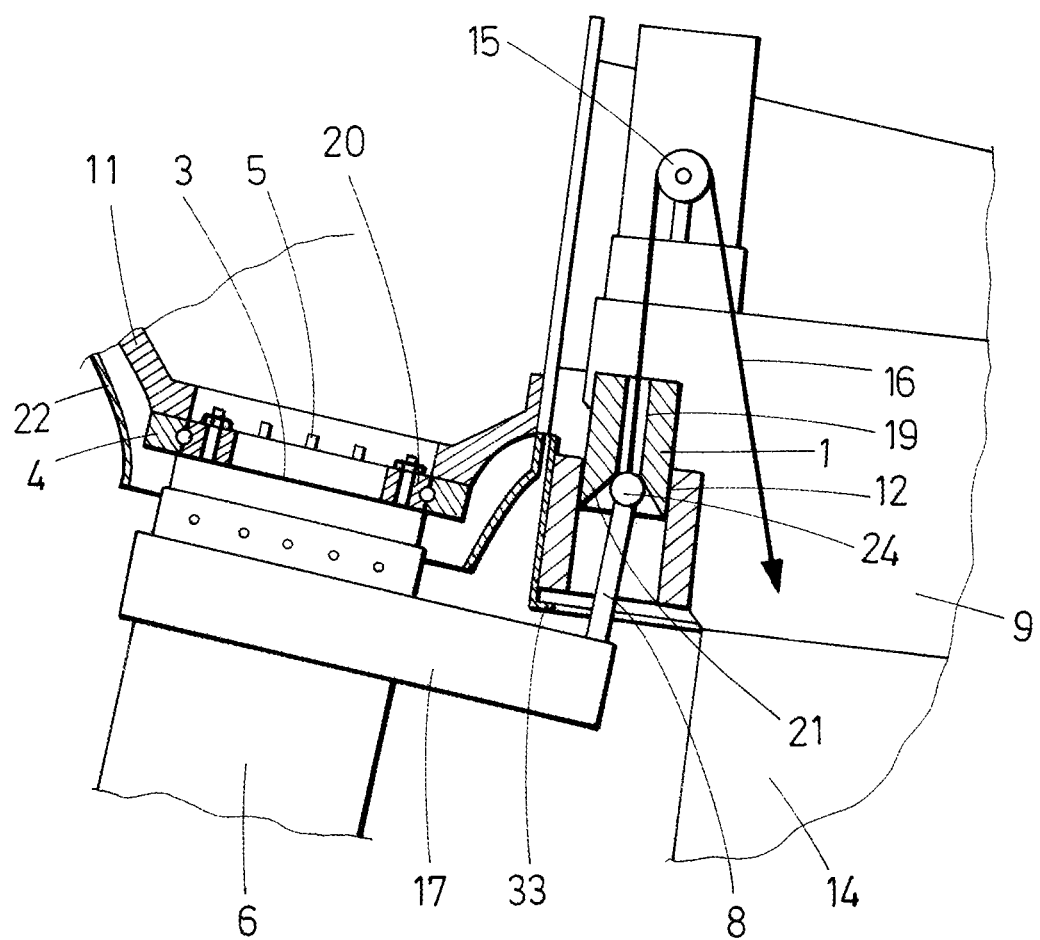
FIG. 8 shows a detail of the system for assembling a blade (stage 4 of a sequence of 4 stages).

Once the bolts (5) are adequately positioned, the raising movement of the blade (6) is done in the direction set by the guiding element (12), i.e. the desired angle of the blade (6), with the blade positioned in an adequate angle, the bolts of the blade being parallel to the holes (7) of the hub. And, finally, as shown in FIG. 8, the bolts (5) of the blade (6) are inserted in respective holes (7) and the connection of them can be finished, for example, by connecting nuts to their ends.

FIGS. 9-11 show an embodiment of the blade raising tool (17) (the root part of a blade raising tool in one embodiment). As it can be seen it is attached to the blade (6) on the outer surface and fixated via bolts (34) to the t-bolts (35) embedded in the blade (6) in the area of the root. They have to be accessible for extraction once the blade (6) is connected to the hub (11) in order to descend the tool (17) and proceed to the connection of another blade. For this purpose, in a preferred embodiment some thru holes are provided in the t-bolts (35).

The cables (16) used for raising the blade (6) are attached on their second end to the blade raising tool (17).

In a preferred embodiment the blade raising tool (17) comprises two halves (27) rotatably connected through a hinge (25). This feature makes easier the operations of attaching and detaching the raising tool (17). A security attachment element (26) for closing and joining together the halves (27) is also provided in form of a hydraulic piston, for example.

A couple of second positioning elements (8) are provided on two sides of the blade raising tool (17), configured to cooperate with the first positioning elements (1) attached to the main frame (9) or tower (14).

The way in which the blade raising tool is attached to the blade, more precisely, the position of the same is next described. As the blade raising tool (17) comprises second positioning elements (8) that would affect the position of the bolts (5) with respect to associated holes (7) comprised in the hub (11), or the pitch bearing (20), the position of those elements (8) with respect to the bolts (5) prior to any raising operation has to be accurate.

Also, in a preferred embodiment, when performing the assembly/disassembly of a blade (6), the hub (11) is oriented upwind and the blade (6) is raised in a feathered position in order to minimize the thrust caused by wind and ensure a secure operation. The pitch bearing (20) is also positioned in a feathered position, and it must be ensured that each bolt (5) enters its respective hole (7) (an error of one rotated position has a really negative impact on production and loads). A bolt indicating the zero position is to be inserted in the zero position hole of the blade pitch bearing (20).

For this purpose, the orientation of the blade raising tool (17) with respect to the bolts (5) of the blade (6) is controlled by fitting a bolt (34) in associated T-bolt (35). For ease of this kind of operations, colored bolts, holes and parts of the blade raising tool (17) can be provided.

The system further comprises supporting means (13) adapted to be joined to the blade (6) in a supporting blade area located between a maximum chord area and the blade tip; being the supporting means adapted to rest on the tower (14) or on at least one tensioned cable and to separate the supporting blade area from the tower (14) at a distance that, when the first (1) and second (8) positioning elements cooperate, the axis of the blade stud is substantially parallel to the axis of the hub connection hole In another embodiment, the blade raising tool (17) comprises a supporting-part configured to be located in a supporting blade area located between a maximum chord area and the blade tip, for example, the region of the center of gravity and attached to a root part so as to be moved upwards as the root part is pulled by the cables (16) and being the root part configured as explained before. This supporting-part comprises some kind of adjustable elastic cradles configured to fit the blade profile shape in the supporting blade area in order to transmit part of the weight loads of the blade (6) either to a tower (14) or to a couple of guiding cables (36) acting as a first positioning elements, without damaging the blade surface. For this purpose, the supporting part comprises some supporting means adapted to rest on the tower or on at least one tensioned cable and to separate the supporting blade area from the tower at a distance that, when the first and second positioning element cooperate, the axis of the blade bolt is substantially parallel to the axis of the hub connection hole.

FIGS. 12-15 show two embodiments wherein the blade raising tool (17) comprises a center-of-gravity-part attached to a root part (31) as explained before.

In the embodiment shown in FIGS. 12 and 13 a couple of supporting elements (13) are connected to the blade raising tool (17) in the supporting-part (30) and resting on the tower (14) surface. Those supporting elements (13) may comprise some sort of wheels (29) in their end contacting the tower (14) surface, so as to roll on it as the blade (6) is raised. Their length is set to be adequate to both the dimensions of the tower (14) and the nacelle (2) in such a manner that, when the bolts (5) in the blade root are about to be inserted into respective holes (7), the desired angle of the blade (6) is ensured and the second positioning element (8) fits its position within the first positioning element (1). In an embodiment, those supporting elements (13) comprise some sort of actuators, as for example, electric or hydraulic piston, in order to vary their length and adjust the blade angle.

In an embodiment, also a supporting element (13) provided with wheels (29) is connected to the blade raising tool (17) in the root part (31) in order to achieve an enhanced stability of the blade when being lifted.

In the embodiment shown in FIGS. 14 and 15, the first guiding elements serve also as first positioning elements and are a couple of tensioned guiding cables (36) attached to the main frame (9), their attachment point position in the main frame being adjustable so as to provide accurate position of the bolts of the blade with respect to the holes. The guiding cables are also connected to an attachment point (28) provided on the ground. Their angle is set by adjusting the position of said attachment points (28) on the ground. In said embodiment, the blade raising tool (17) also comprises a supporting-part (30) and a root part (31) that slide resting on the guiding cables. For that purpose, both of them (30, 31) are provided with second guiding elements (32) configured to cooperate with the cables (36) acting as first guiding elements. Those second guiding elements actuate as well as second positioning elements.

The position of the attachment points (28) on the ground is adapted in such a manner that, when the bolts (5) in the blade root are about to be inserted into respective holes (7), the desired angle of the blade (6) is ensured. As said before, those cables (36) acting as first guiding elements are attached to the main frame (9) (or other stationary part as for example the tower (14)) to an attachment point which position may be adjusted so as to guarantee coincidence of the bolts with the holes (7).

When the blade (6) is finally connected to the hub flange (4) by means of the pitch bearing (20), the system is dismantled using conventional tools frequently used for that purpose within the state-of-the-art, like a hoist. For descending the blade raising tool (17), the cables (16) used for raising the blade (6) are used.

In a preferred embodiment, the nacelle cover (33) is suited with a service door in the lower part of it in the region where the elements of the system are located.

A method for assembling and disassembling a blade with such a system is also within the scope of this invention.

What is claimed is:

1. A method for assembling a blade of a wind turbine, the wind turbine comprising a tower having a tower surface and resting on a base, a nacelle mounted atop the tower, a hub rotatably attached to the nacelle, the hub comprising a hub connection flange adapted to be detachably connected to a blade connection flange of a rotor blade, the method comprising the next steps:
    fixing a first positioning element in the nacelle or in the top of the tower,
    fixing a second positioning element to the blade in a root blade area,
    lifting the blade to the vicinity of the hub connection flange by means of a lifting means,
    putting into contact the first and the second positioning elements;
    providing an accurate position of the blade connection flange, prior to the connection to the hub connection flange, by cooperation of the first and the second positioning elements; and
    providing, when the first and the second positioning elements cooperate by coming into direct contact with each other, a trajectory of the blade which is parallel to an axis of at least one hub connection hole, disposed in the hub connection flange, the provision of the trajectory being carried out by means of a guiding element joined to either the first positioning element, the second positioning element, or both.

2. The method of claim 1, wherein the connection flange of the rotor blade comprises at least one blade stud configured to be inserted into the at least one hub connection hole, the method further comprising a step of joining a supporting means to the blade in a supporting blade area located between a maximum chord area and a blade tip, resting the supporting means on the tower or on at least one tensioned cable when the blade is lifted by means of the lifting means and separating the supporting blade area from the tower at a distance that, when the first and the second positioning elements cooperate, an axis of the blade stud is substantially parallel to the axis of the hub connection hole.

3. The method of claim 2, wherein the supporting blade area is located between the maximum chord area and a center of gravity area.

4. The method of claim 2, wherein the supporting means comprises an end contacting the tower surface, and wherein the step of lifting the blade comprises rolling the blade on the tower surface by means of wheels comprised in the end of the supporting means contacting the tower surface.

5. The method of claim 2, further comprising a step of adjusting a distance between the blade and the tower by varying dimensions of actuators comprised in the supporting means.

6. The method of claim 2, wherein the step of lifting the blade comprises sliding, on two tensioned cables, sliding elements comprised in the supporting means.

7. The method of claim 1, wherein the step of lifting the blade comprises:
    attaching a blade raising tool to an outer surface of the blade; and
    fixing the second positioning element to the raising tool.

8. The method of claim 7 further comprising attaching, to a cable wherein the second positioning element is fixated, a root-part comprised in the blade raising tool.

9. The method of claim 8, further comprising the step of fixing, by means of bolts, the blade raising tool to at least three t-bolts of a plurality of t-bolts embedded in the root area.

10. The method of claim 7, wherein the blade raising tool comprises two halves rotatably connected through a hinge, the method further comprising a step of closing and joining together the two halves by means of a security attachment element in the form of a hydraulic piston.

11. The method of claim 10, wherein the first positioning element comprises two first positioning elements, wherein the blade raising tool comprises two second positioning elements which cooperate with the two first positioning elements attached to a main frame of the nacelle or the tower, and wherein the method further comprises providing each one of the two second positioning elements in each of the two halves of the blade raising tool.

12. The method of claim 1, wherein the lifting means comprise: at least one hoisting system located on the ground; at least one cable connected to a blade raising tool by a first side of the cable and to the hoisting system by a second side of the cable, and a pulley system including at least one pulley detachably connected to a component stationary connected with a main frame of the wind turbine or to the tower, wherein the at least one pulley guides the at least one cable from the blade to the hoisting system.

* * * * *